Aug. 18, 1953          G. R. STIBITZ            2,649,247
                         SLIDE RULE
Filed Aug. 22, 1951                       2 Sheets-Sheet 1
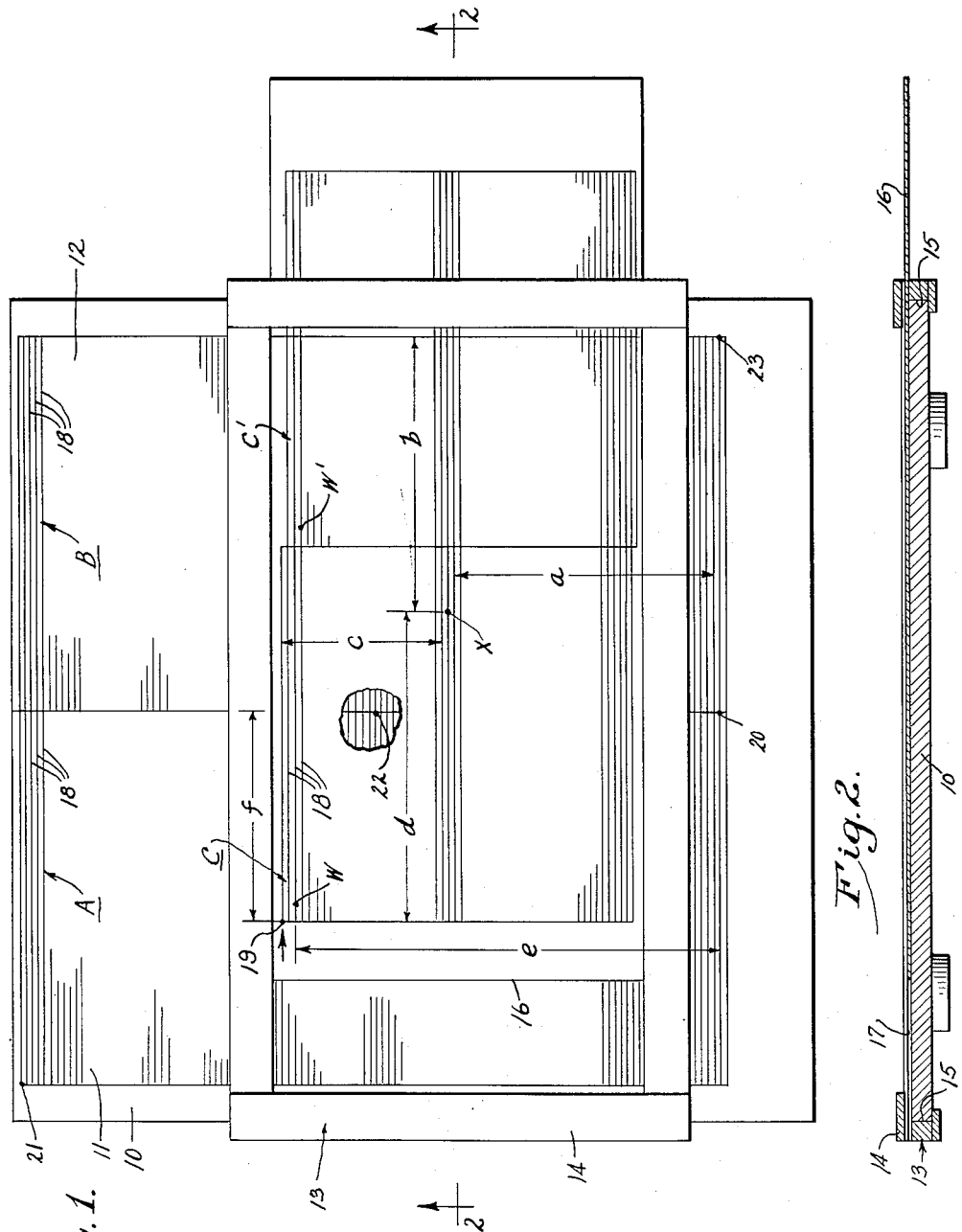
INVENTOR.
George R. Stibitz
BY
ATTORNEYS Aug. 18, 1953   G. R. STIBITZ   2,649,247
SLIDE RULE Filed Aug. 22, 1951   2 Sheets-Sheet 2

INVENTOR.
George R. Stibitz
BY
Carlson, Pitzner, Hubbard & Wolfe
ATTORNEYS

Patented Aug. 18, 1953

2,649,247

UNITED STATES PATENT OFFICE 2,649,247

SLIDE RULE

George R. Stibitz, Burlington, Vt., assignor to Barber-Colman Company, Rockford, Ill., a corporation of Illinois Application August 22, 1951, Serial No. 243,027

3 Claims. (Cl. 235—70)

1

This invention relates to a slide rule for effecting multiplication and division and having a slide bearing one logarithmic scale reciprocable along a base carrying the other logarithmic scale.

One object of the invention is to provide a new and improved slide rule which, as compared to prior slide rules of the above character, is capable of a larger number of computations with greater accuracy and yet is not bulky in size or difficult to manipulate.

A more detailed object is to divide both of the logarithmic scales into a plurality of parts with the parts of one scale arranged in parallel rows on the base and the parts of the other scale arranged in parallel rows on the slide which itself is mounted for endwise movement and also for movement transversely of the scale rows.

Another object is to adapt a slide rule of the above character for use in computing gear ratios.

A further object is to facilitate matching of the scale numbers on the slide and base by arranging the numbers of the slide scale within transparent windows coacting with the light areas on the base.

Other objects and advantages of the invention will become apparent from the following detailed description taken in connection with the accompanying drawings, in which Figure 1 is a plan view of a slide rule embodying the novel features of the present invention.

Fig. 2 is a sectional view taken along line 2—2 of Fig. 1.

Figure 3:
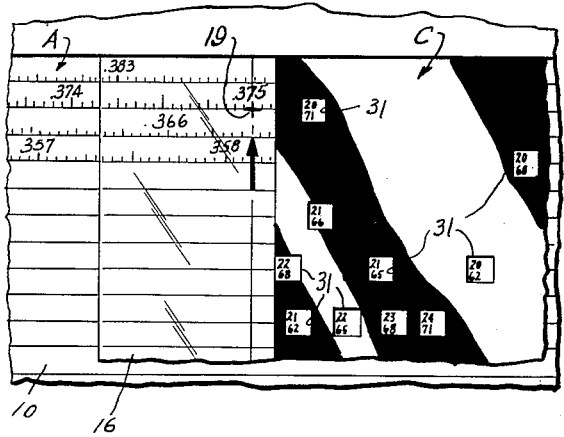
Figs. 3 and 4 are enlarged fragmentary views of a modified form of a slide rule adapted to calculate gear ratios.
Figure 4:
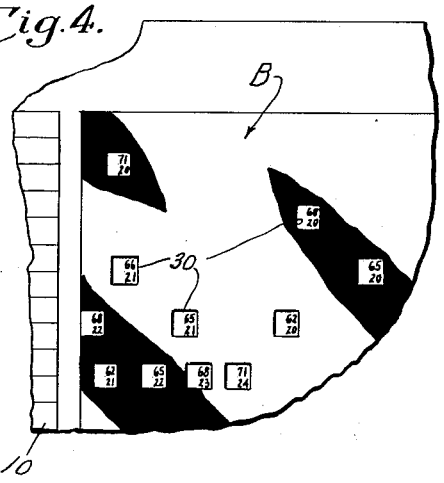

To illustrate the invention, Fig. 1 shows a base plate 10 divided into two rectangular surfaces 11 and 12 on which are inscribed a product scale A and a multiplier scale B respectively. Traversing the plate 10 is a compound slider 13 comprising a rectangular open frame 14 with channels 15 (Fig. 2) engaging the sides of the plate 10 for vertical movement of the slider. A rectangular transparent slide 16 inscribed with a multiplicand scale C slides on the frame 14 in grooves 17 for horizontal movement of the slider. Each of the scales, A, B, and C is divided into a plurality of parallel parts or lines

2

18, but the compound motion of the slider 13 permits the scale C and an index mark 19 also inscribed on the slide 16 to move along paths both parallel and perpendicular to the lines 18 on the scales A and B and thus to be matched with the latter.

The product scale A starts at a reference point 20 at the lower right hand corner thereof as viewed in Fig. 1 with, for example, "1.0000" and from there the numbers are logarithmically spaced toward the left along the lowest line. The left end of the lowest line represents the same scale number as the right end of the next higher line from which point the logarithmic spacing continues toward the left of this line. In this manner, the entire scale A is laid out, stepping up one line at a time, until a point 21 at the upper left hand corner of the scale is reached. If the scale A is to be the equivalent of the "C" scale of a conventional slide rule, this last point will again be "1.0000." The accuracy of the scale A, therefore, is equivalent to the accuracy which could be obtained by making the conventional "C" scale of a ordinary slide rule as long as the combined lengths of all the lines in this scale. In order that the principle of the invention may be more easily understood, however, the scale A will be considered as repeating, that is, the upper half is the same as the lower half with the end point 22 of the lower part being the starting point of the upper part. The index mark 19 on the slide 16 can then be more easily made to fall within the bounds of the product scale A. The multiplier scale B is identical to the product scale having its reference point 23 also at the lower right hand corner.

The starting point or index mark 19 of the multiplicand scale C is at the upper left hand corner and from there the scale progresses from left to right and downwardly. In addition, as illustrated in Fig. 1, this scale does not repeat but in all other respects it is the same as scales A and B, the number of lines and the length of each being the same.

With the above arrangement, the product of a number on the multiplier scale B and the number directly thereover on the multiplicand scale C will be indicated on the product scale A under the index mark 19. To illustrate, the numbers at point X will be considered, that point on the multiplier scale B being referred to as $X^b$ and on the multiplicand scale C as $X^c$. It will be seen that the logarithm of $X^b$ is equal to the combined lengths of all the lines on scale B within the distance $a$ plus the distance $b$. Similarly, the logarithm of $X^c$ is equal to the total length of the lines within the distance $c$ plus the distance $d$. Since the number of lines on the product scale A within the distance $e$, which extends from the bottom of the scale A to two lines below the index mark 19, is the same as the number of lines within the sum of distances $a$ and $c$, the number of whole lines in the logarithm of $X^b$ has been added to the number of whole lines in the logarithm of $X^c$. The sum of the remaining distances $b$ and $d$ is equal to one whole line plus the distance $f$ which, as will be seen from Fig. 1, added to the lines within distance $e$ produces the point at which the index mark 19 falls on the product scale A. In effect, therefore, vertical movement of the frame 14 adds the whole number of lines of the multiplier and the multiplicand scales while horizontal movement of slide 16 adds the remaining partial lines of the two.

While scales A, B, and C can be used to multiply any two numbers appearing thereon, it is often desirable to set the index mark 19 over a selected point on the product scale A and determine the different combinations of numbers on scales B and C which produce the selected product. It will be apparent that if the slider 13 carries just the scale C, only some of the possible combinations will be indicated since a portion of the scale C is not over the scale B. To remedy this, another scale C' identical to the scale C is inscribed immediately to the right of the latter. Point W' on the scale C', however, is one whole line farther away from the index mark 19 than is the same point W on the scale C. To compensate for this, therefore, the entire scale C' has been stepped down one line relative to scale C.

The exact orientation of the various scales described above is given by way of example only. The scales may be arranged in many other ways depending upon the desired range of operation of the slide rule. For example, "1.0000" could appear at the vertical midpoint on scales A and B with numbers greater than one above the point and those less than one below the point. Likewise, it is not necessary that scales A and B be similarly oriented as long as the logarithmic relation of all the scales is maintained.

The slide rule as generally described above is readily adaptable for use in determining the number teeth for each of two sets of gears 24, 25, and 26, 27 intermeshing in a train to form a driving connection between an input shaft 28 and an output shaft 29. Thus the drive ratio through the sets of gears may be considered as a product number on the scale A while a fraction representing the number of teeth on one set of gears 24, 25 is a multiplier number on the scale B and a fraction representing the number of teeth on the other set of gears 26, 27 is a multiplicand number on the scales C and C'.

Since the variety of gears generally available is somewhat limited, not all the possible fractions on scales B, C and C' are useful and it is desirable to block out all but the fractions representing the more conventional sets of gears on those scales. Thus, the scale B takes the form of a dark background with a plurality of light areas 30 each with a fraction marked therein and scales C and C' on the slide 16 are generally opaque with windows 31 within which are inscribed the fractions of those scales. The center of each light area 30 is the point to which the distance representing the logarithm of its corresponding fraction is measured while the center of the windows 31 is the measuring point for the fractions on the slide 16. Thus, since the windows 31 are of the same size and shape as the light areas 30, matching a selected window with a given light area results in the addition of the logarithms of the corresponding multiplier fraction and multiplicand fraction and the ratio of the two sets of gears 24, 25 and 26, 27 represented by these fractions is indicated on the product scale A by the index mark 19. In order that both fractions may be clearly visible when a window coincides with a light area, the multiplier fractions are disposed on the right side of the light areas 30 while the multiplicand fractions are inscribed at the left side of the windows 31.

Since the same sets of gears may be used for a ratio greater than one as for a ratio corresponding to its reciprocal, the greatest useful range will be obtained when the product scale A is restricted to numbers less than one. Thus, in adapting the slide rule for use in determining gear ratios, "1.0000" is placed at the upper right hand corner of the scale A and the entire scale, a part of which is shown enlarged in Fig. 3, is laid out in decimal fractions.

Figure 5:
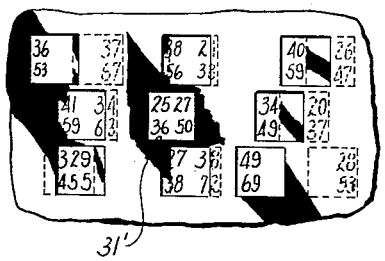
Fig. 5 is an enlarged fragmentary view of the embodiments of Figs. 3 and 4 showing the manner in which the scales on the slide and the base are matched.
Figure 6:
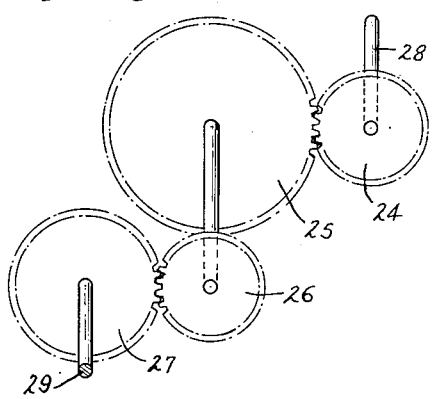
Fig. 6 is a schematic view of a gear train the ratio of which may be calculated by the embodiment of Figs. 3 and 4.

Assuming that it is desired to determine what sets of gears 24, 25 and 26, 27 may be used to produce a drive ratio of .3750, for example, the index mark 19 is first set at that ratio on the product scale A as shown in Fig. 3. Then, the right portion of the slide 16 is inspected to see which windows 31 are disposed directly over and in full register with a light area 30. As seen in Fig. 5, only window 31' exactly coincides with a light area, the other windows being displaced varying amounts from their nearest light areas. Thus, by using gears with 27 and 50 teeth for the set 24, 25 and with 25 and 36 teeth for the set 26, 27, the desired ratio between the shaft 28 and the shaft 29 will be obtained. Of course, the same ratio may be produced by different combinations which will be indicated simultaneously by other matching windows and light areas.

I claim as my invention:

1. A slide rule for determining the ratio of a train of four gears comprising a plate defining first and second rectangular surfaces arranged in edge to edge relation, a frame overlying said areas and movable edgewise along a path paralleling the adjacent edges thereof, a slide mounted on said frame for endwise movement along a perpendicular path, an elongated product scale carried by said first surface, having numbers corresponding to different ratios of said train and spaced therealong and from a predetermined reference point in accordance with the values of the logarithms of the numbers, said scale being divided into a plurality of parallel parts paralleling said second path, an elongated multiplier scale having fractions denoting the number of teeth on two of the gears and spaced therealong from said reference point distances corresponding to the logarithms of the fractions, said second scale being carried by said second surface and divided into a plurality of parallel parts paralleling said second path, and a multiplicand scale on said slide having fractions denoting the number of teeth on the other two gears and spaced therealong from an index mark on said slide successive distances corresponding to the logarithms of such fractions, said third scale being divided into a plurality of parts paralleling said multiplier parts whereby, when a selected multiplicand is, by shifting of said frame and slide, superimposed upon a selected multiplier, the ratio of the train will be disposed on said first surface opposite the index mark on said slide.

2. A slide rule comprising a plate defining first and second rectangular surfaces arranged in edge to edge relation, a frame overlying said surfaces and movable edgewise along a path paralleling the adjacent edges thereof, a slide mounted on said frame for endwise movement along a perpendicular path, an elongated product scale carried by said first surface, having numbers spaced therealong and from a predetermined reference point in accordance with the values of the logarithms of the numbers, said scale being divided into a plurality of parallel parts paralleling said second path, an elongated multiplier scale having numbers spaced therealong from said reference point distances corresponding to the logarithms of the numbers, said second scale being carried by said second surface and divided into a plurality of parallel parts paralleling said second path, each of said multiplier numbers being disposed on said plate within and on one side of a light area on said second surface, and a multiplicand scale on said slide having numbers spaced therealong from an index mark on said slide successive distances corresponding to the logarithms of such numbers, said third scale being divided into a plurality of parts paralleling said multiplier parts, each of said multiplicand numbers being disposed within and on a different side of a transparent window on said slide of a shape similar to said light area, whereby, when the window of a selected multiplicand is, by shifting of said frame and slide, superimposed upon the light area of a selected multiplier, the product will be disposed on said first surface opposite the index mark on said slide.

3. A slide rule comprising a base having first and second parts arranged in edge to edge relation, an elongated slide mounted on said base for endwise movement along a path over said parts, an elongated product scale carried by said first part paralleling said path and having numbers spaced therealong from a predetermined reference point in accordance with the logarithms of the numbers, an elongated multiplier scale carried by said second part paralleling said path and having numbers spaced therealong from said reference point distances corresponding to the logarithms of the numbers, each of said multiplier numbers being disposed within a light area on said second part, and a multiplicand scale on said slide having numbers spaced therealong from an index mark on said slide successive distances corresponding to the logarithms of such numbers, each of said multiplicand numbers being disposed within a transparent window on said slide of a shape similar to the shape of said light area, whereby, when the window of a selected multiplicand is, by shifting of said slide, superimposed upon the light area of a selected multiplier, the product will be disposed on said first part opposite said index mark on said slide.

GEORGE R. STIBITZ.

References Cited in the file of this patent

UNITED STATES PATENTS

| Number | Name | Date |
| --- | --- | --- |
| 460,930 | Cox | Oct. 6, 1891 |
| 1,484,176 | Haimes | Feb. 19, 1924 |
| 2,156,568 | Lee | May 2, 1939 |
| 2,168,056 | Bernegau | Aug. 1, 1939 |
| 2,334,725 | Perkins | Nov. 23, 1943 |
| 2,375,878 | Willens | May 15, 1945 |

OTHER REFERENCES

"Special Slide Rules," by J. N. Arnold, published by Purdue University at La Fayette, Indiana, 1933; pages 19–29.